United States Patent [19]

Larsson et al.

[11] 4,436,467
[45] Mar. 13, 1984

[54] EASILY RELEASABLE BLIND RIVETS

[76] Inventors: Sven B. Larsson, Myrgangen 41, S-461 62 Trollhättan; Bengt U. I. Andersson, Björkvägen 8, S-460 20 Sjuntorp, both of Sweden

[21] Appl. No.: 285,855

[22] Filed: Jul. 22, 1981

[30] Foreign Application Priority Data

Jul. 23, 1980 [SE] Sweden ................................. 8005318

[51] Int. Cl.³ ............................................. F16B 13/04
[52] U.S. Cl. ..................................... 411/34; 411/107; 411/81; 411/541
[58] Field of Search ....................... 411/34, 43, 44, 57, 411/82, 103, 107, 410, 411, 901–908

[56] References Cited

U.S. PATENT DOCUMENTS 3,236,143 2/1966 Wing .......................................... 85/37
3,842,710 10/1974 Poupitch ................................... 85/37

FOREIGN PATENT DOCUMENTS 644125 10/1928 France .
467411 2/1969 Switzerland ............................ 411/34
579462 11/1977 U.S.S.R. ................................. 411/34

Primary Examiner—Wayne L. Shedd
Attorney, Agent, or Firm—Holman & Stern

[57] ABSTRACT

A removable blind rivet comprising a tube (1) with a head (3 or 6) on one end to contact one workpiece (11) of two workpieces (10 and 11) to be rivetted together, the other end (14) being upsetable against the other workpiece (10) by a pull pin (5) with a head (4) pulled into the tube, or by blasting an explosive charge (8) inserted in the other end (14) of the tube. The head is a removable nut (3) threaded upon the accessible end of the tube (1), or a spring washer (6) inserted in a slot (7) in the accessible end of the tube.

4 Claims, 10 Drawing Figures

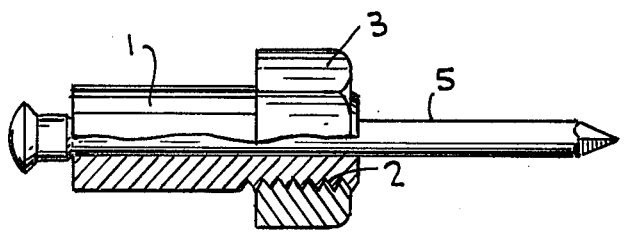
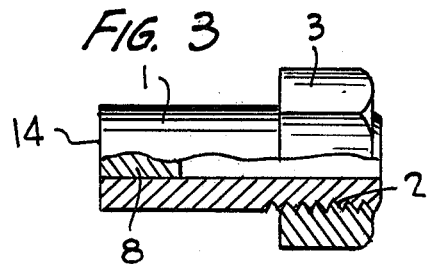
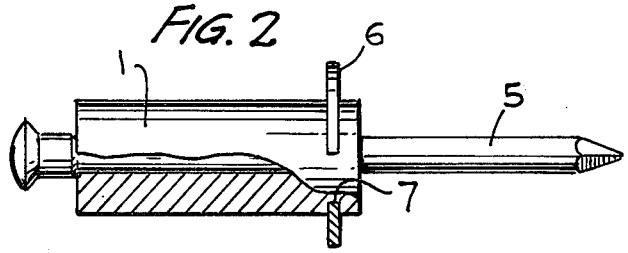
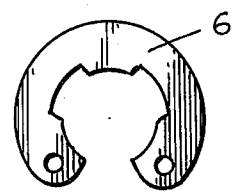
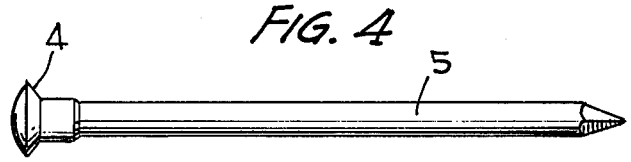
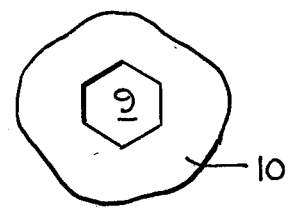
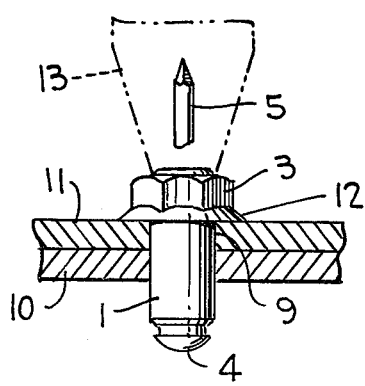
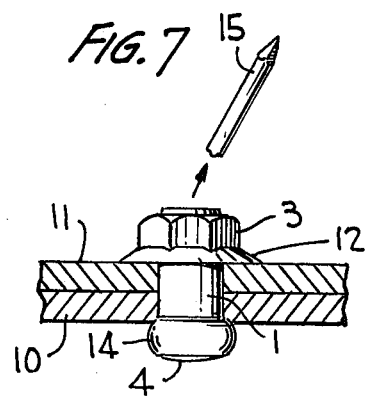
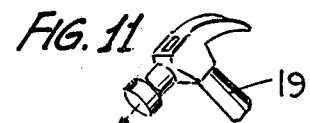
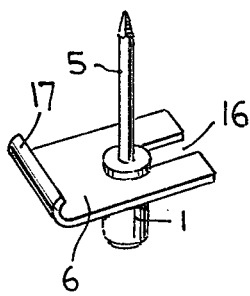
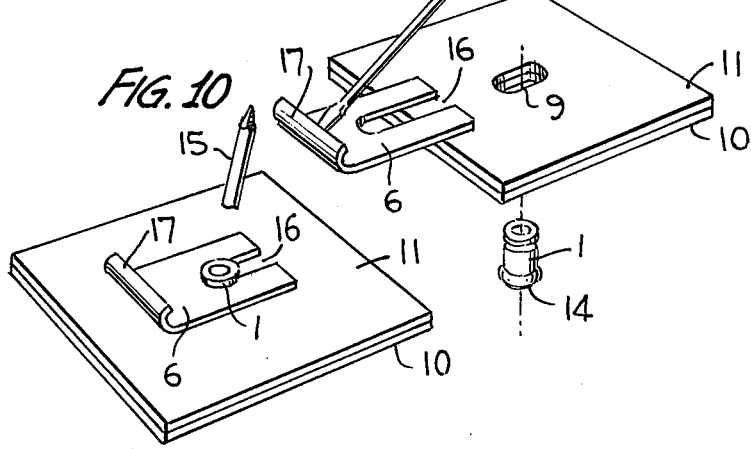

EASILY RELEASABLE BLIND RIVETS

BACKGROUND OF THE INVENTION

1. Field of The Invention

This invention relates to blind rivets to be used where a side of one of two work pieces to be rivetted together is nonaccessible.

2. Description of The Prior Art

For this purpose blind rivets have been used consisting of a tube to be inserted through holes in the work pieces, one end of said tube having a head to contact the external surface of one work piece and the other end having a device, for instance a pull pin with a head, or a blasting charge, to upset the other end of the rivet against the surface of the other work piece. Said pull pin together with its head can partly be pulled into the tube by a special tool to upset the end of the tube.

BRIEF SUMMARY OF THE INVENTION

One object of the invention is to provide a device making possible a simple removal of the finished rivet joint and to this end and according to the invention the head is made removable.

DESCRIPTION OF THE DRAWINGS

The invention, the characteristics of which will be evident from following claims, will be described more in detail below with reference to the attached drawings, FIGS. 1, 2 and 3 are elevational showing partly sectional each its own embodiment of a blind rivet according to the invention;

FIG. 4 is an elevational view of an expanding pull pin which is a part of the blind rivets according to FIGS. 1 and 2;

FIG. 5 is an elevational view of a spring washer used with the rivet embodiment according to FIG. 2;

FIGS. 6 and 7 are cross-sectional views showing the method used when rivetting together two work pieces by the rivet embodiment according to FIG. 1;

FIG. 8 is a plan view of a workpiece which illustrates that a hole for the blind rivet can be given an irregular non-circular cross section in at least the lower work piece according to FIGS. 6 and 7;

FIG. 9 is a perspective view showing a blind rivet according to the embodiment of FIG. 2 having a spring washer of an alternative design; and FIG. 10 is a perspective view showing the blind rivet according to FIG. 9 installed for riveting together two work pieces.

DETAILED DESCRIPTION

The blind rivet as shown in FIG. 1 consists of a tube 1, having its right end provided with threads 2, upon which a nut 3 is screwn to work as a head of the rivet. A pull pin 5 longer than the tube is inserted into the tube, so that a head 4 of the pin contacts the left end of the tube and the pull pin partly projects out from the right end of the tube. FIG. 4 shows the entire pull pin.

In the embodiment according to FIG 2, a U-shaped spring retainer washer 6 is substituted for the nut 3 and is squeezed upon a lot 7 in the tube 1 near its right end. FIG. 5 is a view of a spring washer to be used for this purpose which will be known to those skilled in the art.

In the embodiment of the blind rivet shown in FIG. 3 a blasting charge 8 replaces the pull pin.

As will be seen in FIG. 6 the free portion of the tube 1 is inserted through holes 9 in the work pieces 10 and 11 to be rivetted together. If the upper work piece 11 should be of a weaker material such as plastic it can be more advantageously to thread a washer 12 onto the rivet between the rivets head 3 and the work piece 11. Shown in broken lines is a pulling tool 13 which is threaded upon the end of the pull pin protruding above the tube, by means of which one pulls the pull pin a limited distance through the tube so that the head 7 of the pin upsets the end 14 of the tube, as will be evident from FIG. 7. Now one breaks or cuts off the portion 15 of the pull pin protruding above the tube and the rivet joint is finished.

If thereafter for any reason the rivet joint is to be dismounted, one only has to remove the accessible head of the rivet, in this case by unscrewing the nut 3 from the tube 1 of the blind rivet, after which the upper work piece 11 can be lifted off. After threading the work piece 11 or another work piece upon the tube 1 of the blind rivet the rivet joint can be restored by rescrewing the nut 3 upon the tube 1.

If the hole 9 of at least the bottom work piece 10 has been given an irregular or non-circular cross section, for instance such as the shape shown in FIG. 8, portions of the tube 1 will file up the unevennesses of the hole when upsetting the end 14 of the tube and the blind rivet will be better held and prevented from turning when unscrewing or screwing up the nut 3.

When using a blind rivet of the type shown in the embodiment of FIG. 2, one has to remove the spring retainer washer 6 from slot 7 by means of a tool suitable for this purpose in order to remove the rivet joint.

Another embodiment of a spring retainer washer 6 illustrates in FIG. 9 which shows a washer 6 having a slot 16 extending from one edge of the washer and by which the washer is inserted into slot 7 of the blind rivet 1. The other upwardly bent edge 17 functions as a support for a chisel type tool for knocking away the spring washer by a hammer for example for removing the blind rivet and the rivet joint.

When using a blind rivet of the embodiment shown in FIG. 3 an upset of the end 14 of the tube 1 will be attained by detonating a charge 8 of blasting powder, for example by heating the blind rivet by means of a soldering-iron.

We claim:

1. A blind rivet comprising a tubular member insertable through aligned holes in workpieces to be rivetted together from an outer accessible side to an inner nonaccessible side, an enlarged separate retainer on one end of said tubular member having a cross-section larger than said holes on the outer side of the workpieces, said one end to be installed at said outer side, an expanding pin extending coaxially through said tubular member, an enlarged head on the inner end of said pin having a cross-section larger in size than the bore through said tubular member, but smaller than the hole in the workpiece on the inner side, a tapered expanding surface on said enlarged head of said pin on the side of said head adjacent said inner side of said tubular member so that when said expanding pin is drawn through said tubular member a limited distance said inner end of the tubular member is expanded radially outwardly to a cross-sectional size larger than the hole in the workpiece on the inner side, said retainer being removable from said tubular member so that said rivet may be removed from the workpieces without damaging them.

2. The blind rivet as claimed in claim 1 wherein the outer end of said tubular member is screw-threaded and said retainer comprises an internally threaded nut engaging said screw-threaded end.

3. The blind rivet as claimed in claim 2 and further comprising a non-rotating means associated with said tubular member to prevent rotation of said tubular member in the holes of the workpieces after the rivet has been installed.

4. The blind rivet as claimed in claim 1 wherein said removable retainer comprises a substantially U-shaped spring washer and a peripheral slot in the outer end of said tubular member to receive said washer, said washer being shaped to be retained in said slot by the spring action of the washer.

* * * * *